United States Patent Office 2,938,555
Patented May 31, 1960

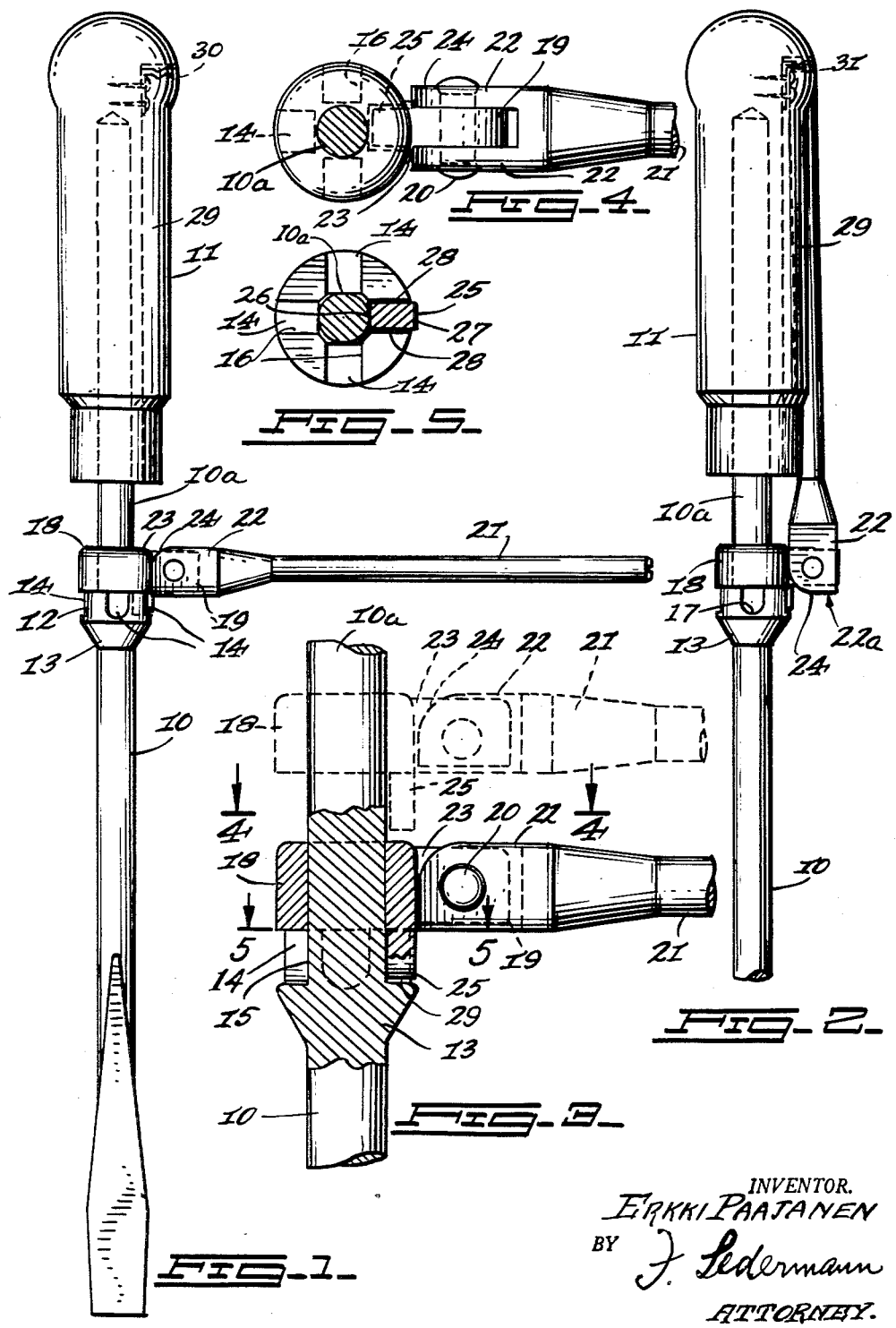

2,938,555
AUXILIARY CRANK FOR A SCREW DRIVER

Erkki Paajanen, 265 Merriam St., Bridgeport 4, Conn.

Filed Apr. 17, 1959, Ser. No. 807,204

1 Claim. (Cl. 145—61)

This invention relates to screw drivers having auxiliary crank means whereby considerable greater torque may be applied to the stem of the screw driver for dislodging tight screws as well as, of course, for tightening screws more snugly than is possible with the usual type of screw driver.

The main object of the invention is the provision of certain new and useful improvements in such screw drivers whereby the efficacy of the increased torque applied by means of the crank is substantially enhanced by virtue of the novel and improved interengaging means between the crank and the stem of the screw driver.

Another object of the invention is the provision of a new and improved screw driver of the type mentioned, which is simple in construction and operation and durable through a long life.

A further object of the invention is the provision of a notched collar integral with the stem of the screw driver near the handle thereof and a sturdy sleeve slidably mounted on the stem between the said collar and the handle, the collar having pivoted thereto a crank which has rigid therewith a tooth or pin engageable selectively in any of the notches in the collar, the crank when not being used registering in a groove in the handle and being provided with a releasable lock which is readily disengaged to release the crank for use.

The above as well as additional and more specific objects will be clarified in the following description wherein reference numerals refer to like-numbered parts in the accompanying drawing. It is to be noted that the drawing is intended primarily for the purpose of illustration and that it is therefore neither desired nor intended to limit the invention necessarily to any or all of the details shown or described except insofar as they may be deemed essential to the invention.

Referring briefly to the drawing,

Fig. 1 is an elevational view of the screw driver showing the crank in position for the application of greater torque in turning a screw.

Fig. 2 is an elevational view showing the crank in position when not in use.

Fig. 3 is a fragmentary elevational view of the stem of the screw driver, with parts broken away and partly in section.

Fig. 4 is a sectional view taken on the line 4—4 of Fig. 3.

Fig. 5 is a sectional view taken on the line 5—5 of Fig. 3.

Referring in detail to the drawing, the numeral 10 indicates the stem of a screw driver, the upper end of which is secured, in any desired manner, in a handle 11. In order to assure solidity and durability of the tool in view of the purposes to which it is put, the various details set forth below are all solidly constructed. If desired. the stem may be rotatably mounted in the handle instead of being secured immovably thereto.

Spaced a short distance below the handle, the stem 10 is provided, integral therewith, with a cylindrical collar 12 having a conical base 13. In the illustration, the collar is provided with two pairs of equidistant diametrically opposed radial notches 14 extending downwardly thereinto and through the outer surrounding wall of the collar. The radially inward or back walls 15 of the notches are flat and vertical, each being at right angles to its neighbors. The vertical sidewalls 16 of each notch are mutually parallel, and the bottom or floor of each notch is semi-cylindrically rounded, as shown at 17.

A sleeve 18 having substantially the same diameter as the collar 12, is slidably mounted on the cylindrical portion 10a of the stem above the collar. The top edge of the collar and the bottom edge of the sleeve are both flat and at right angles to the axis of the stem portion 10a. The sleeve has a radial arm 19 extending therefrom, and pivoted thereto on a pin 20 is a crank arm 21 having a forked end through the legs 22 thereof through which the pin 20 passes. On opposite sides of the arm 19, the sleeve has two vertical ridges extending outward beyond the cylindrical confines of the collar, each ridge being positioned in the plane of one of the fork legs 22, as shown at 23. The lower portions 22a of the extremity of each leg 22 (when the crank is horizontal as seen in Figs. 1 and 3) are flat and at right angles to the crank, so that when the crank is horizontal these extremities provide a firm and even engagement with the ridges 23. The upper portions of the extremities of the fork legs are rounded, as shown at 24, to permit rotation of the crank upward through an arc of 90 degrees. Thus the ridges provide limit stops to the horizontal positioning of the crank and when the crank is swung in either horizontal direction one of the ridges takes up the pressure of the adjacent one of the fork legs. Hence the strain of this force is not limited to the pivot pin and the effective torque applied to the sleeve is enhanced.

Depending from the flat lower edge of the sleeve is a tooth 25 which has radially opposed flat surfaces 26 and 27, the former being complementary to the surface 15 of any one of the notches 14. Likewise the other opposed surfaces 28 of the tooth are flat and vertical and thus complementary to the opposed surfaces 16 of any of the notches. The lower end 29 of the tooth is semi-cylindrically rounded complementary to the floors 17 of the notches.

In use with the crank in horizontal position as shown in Figs. 1 and 3, it is apparent that by virtue of the snug engagement of the tooth 25 in any notch 14, an efficient transmittal of the force applied in turning the crank in either direction, to the collar 12, is effected.

In order that the crank may be folded upward out of the way when the screw driver is to be used without the aid of the crank, a longitudinal groove 29 is provided in the handle, in which the crank may register. A spring catch 30 in the wall at the upper end of the groove is engageable in a complementary indent 31 in the end of the crank, to releasably hold the crank in the groove. In order to free the crank from its spring catch, the stem of the screw driver is held in one hand and, with the side of the handle having the groove 29 therein facing the palm of the other hand, then the tip of the handle is struck against the palm whence the handle frees itself from the spring and swings out of the groove.

Thus a very satisfactory and efficient screw driver has been provided, and obviously various modifications in form or structure may be made without departing from the spirit or scope of the invention.

The invention having thus been described, what is claimed and desired to be secured by Letters Patent is as follows:

A screw driver comprising a stem having a handle on one end thereof, a collar integral with the stem spaced a distance below said handle, the portion of the stem between the collar and the handle being cylindrical, the collar having four equidistantly circumferentially spaced radial notches extending downwardly thereinto and through the circumferential wall of the collar, a sleeve slidably and rotatably mounted on said cylindrical portion of the stem and having a downwardly projecting tooth on the underside thereof complementary to and selectively registrable in said notches, the length of said cylindrical portion of the stem being at least equal to the combined lengths of said collar and said tooth, said sleeve having a radial arm rigid therewith lying in the plane of said tooth, a forked crank arm having co-planar end surfaces on the ends of the legs of the fork thereof, said crank arm being pivoted to said radial arm on a pivot at right angles to said stem and adapted to be swung between a position of substantial parallelism and juxtaposition to said handle and a position at right angles to said stem, and means on the collar engageable by said end surfaces to relieve the strain on said pivot when the crank arm is swung in either rotational direction on the axis of the stem when said tooth registers in a notch and said crank arm is in said last-named position, the portion of said stem which is circumscribed by said notches being square in cross-section and having the four sides thereof providing the radially inward walls of said notches, said tooth having a rectangular cross-section complementary to said notches and having the radially inward surface thereof flat and flush with the said radially inward wall of the notch in which it registers.

References Cited in the file of this patent

UNITED STATES PATENTS

| | | |
|---|---|---|
| 244,309 | Rhodes | July 12, 1881 |
| 1,004,496 | Suster | Sept. 26, 1911 |
| 1,459,708 | Powers | June 19, 1923 |
| 2,621,688 | Wales | Dec. 16, 1952 |
| 2,641,291 | Yess | June 9, 1953 |

FOREIGN PATENTS

| | | |
|---|---|---|
| 499,786 | Germany | June 13, 1930 |